(12) United States Patent
Noriega

(10) Patent No.: US 7,796,514 B2
(45) Date of Patent: Sep. 14, 2010

(54) SYSTEM AND METHOD FOR MULTI-SERVICES PACKET NETWORK TRAFFIC ENGINEERING

(75) Inventor: Dimas Noriega, Woodstock, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 73 days.

(21) Appl. No.: 12/316,351

(22) Filed: Dec. 11, 2008

(65) Prior Publication Data

US 2010/0149971 A1 Jun. 17, 2010

(51) Int. Cl.
- *H04J 1/16* (2006.01)
- *H04J 3/16* (2006.01)
- *H04J 12/28* (2006.01)
- *H04L 12/28* (2006.01)

(52) U.S. Cl. .................. 370/230; 370/252; 370/254; 370/395.43; 370/468

(58) Field of Classification Search .................. 370/230, 370/252, 254, 230.1, 395.21, 395.43, 229, 370/394.41, 468

See application file for complete search history.

(56) References Cited

U.S. PATENT DOCUMENTS

| | | | | |
|---|---|---|---|---|
| 6,404,735 | B1 * | 6/2002 | Beshai et al. | 370/230 |
| 6,412,000 | B1 * | 6/2002 | Riddle et al. | 709/224 |
| 7,046,631 | B1 * | 5/2006 | Giroux et al. | 370/234 |
| 7,653,084 | B2 * | 1/2010 | Shin et al. | 370/468 |
| 2002/0167967 | A1 * | 11/2002 | Jammes et al. | 370/468 |
| 2007/0127487 | A1 * | 6/2007 | Kim et al. | 370/392 |
| 2007/0248007 | A1 * | 10/2007 | Rajan | 370/230 |
| 2008/0049614 | A1 * | 2/2008 | Briscoe et al. | 370/230 |

* cited by examiner

*Primary Examiner*—Steven H Nguyen
*Assistant Examiner*—Candal Elpenord

(57) ABSTRACT

Systems and methods are described that provide network traffic engineering that obviate network over-provisioning by providing QoS to each traffic class. Embodiments dimension switching router LTE schedulers to ensure that each traffic class receives an appropriate QoS in terms of delay, jitter, Packet Loss Ratio and throughput.

42 Claims, 13 Drawing Sheets

SYSTEM AND METHOD FOR MULTI-SERVICES PACKET NETWORK TRAFFIC ENGINEERING

BACKGROUND OF THE INVENTION

The invention relates generally to 3rd Generation Partnership Project (3GPP) Long Term Evolution (LTE) Self-Optimizing Networks. More specifically, the invention relates to traffic engineering systems and methods that efficiently adjust multimedia Internet Protocol (IP) networks to evolving traffic load patterns and growth.

A multimedia IP network must accommodate traffic flows having different characteristics, Quality of Service (QoS) and Per Hop Behavior (PHB) requirements. These three aspects are the Service Level Specification (SLS) which is the technical specification of the service level being offered by a Service Provider to a Subscriber. The number of SLSs may vary from 1 to 16 depending on customer application requirements. The varying SLSs in multimedia networks are difficult to satisfy without traffic segregation into classes and the corresponding network bandwidth partitioning.

Metro Ethernet Forum (MEF) Technical Committee specification 10.1 provides the definition and scope of traffic management mechanisms and parameters for Ethernet services. This helps the Service Provider and its Subscriber to mutually agree on an SLS associated with a given service instance. In particular, MEF 10.1 specifies a common way for specifying bandwidth profiles and performance definitions. The bandwidth profile includes a set of traffic parameters and rules for the disposition of each Service Frame based on its level of compliance with the Bandwidth Profile parameters.

The performance definitions are a set of service performance metrics in terms of Frame Delay, Frame Delay Variation, and Frame Loss Ratio that are useful in aligning a service with the application that will use it. The parameters comprising the Bandwidth Profile parameters are: 1) Committed Information Rate (CIR) expressed as bits per second (bps). The CIR must be greater than 0.2) Committed Burst Size (CBS) expressed as bytes. When the CIR is greater than 0, the CBS must be greater than or equal to the maximum Service Frame size as specified. 3) Excess Information Rate (EIR) expressed as bps. The EIR must be greater than 0. 4) Excess Burst Size (EBS) expressed as bytes. When the EIR is greater than 0, the EBS must be greater than or equal to the maximum Service Frame size as specified. 5) Coupling Flag (CF). 6) Color Mode (CM). Each incoming Service Frame is classified to determine which, if any, Bandwidth Profile is applicable to the Service Frame. Operation of the Bandwidth Profile algorithm is governed by the above six parameters, CIR, CBS, EIR, EBS, CF and CM. An algorithm declares Service Frames as compliant or non-compliant relative to the Bandwidth Profile parameters. The level of conformance is expressed by one of three colors; green, yellow or red. The Bandwidth Profile algorithm is in color aware mode when each incoming Service Frame already has a level of conformance color associated with it and that color is taken into account in determining the level of conformance to the Bandwidth Profile parameters.

MEF 10.1 is compatible with the Internet Engineering Task Force (IETF) Differentiated Services (DiffServ) Traffic Engineering (TE) framework. The DiffServ framework is aimed at providing a way of setting up QoS using policy statements that form part of a service level agreement between a service user and a network operator. The policy may use several IP packet header fields to classify the packet, but the classification marking can also be a simple identifier within the packet header. DiffServ codepoints are used to identify packets that should have the same aggregate PHB with respect to how they are treated by individual network elements within the network. Furthermore, DiffServ Codepoints (DSCPs) may be mapped into Ethernet (p) bits. To support the DiffServ model, the IETF has released the Russian Dolls Model (RDM) and Maximum Allocation Model (MAM) bandwidth management drafts.

Voice, data, and video traffic may be assigned to either one of two broad traffic categories, real-time (streaming) or elastic. Real-time packets need to be delivered in a timely manner with packet delay and delay variation being the most important quality measures. If a voice packet is not delivered within the required time constraints, it is considered not useful by the upper layer protocols and will be discarded. Real-time traffic is usually generated by real-time applications such as audio/video communications. The Expedited Forwarding (EF) PHB is used to provide a low loss, low delay, and low jitter end-to-end service across a DiffServ domain for this traffic.

Real-time streaming traffic is open-loop controlled, with rate and duration as intrinsic characteristics. From the end user standpoint, the main QoS indicators are negligible service request rejection (low blocking) as well adequate transmission quality (low delay and low jitter).

Applications that generate elastic traffic require reliable packet delivery. Every piece of data needs to be transferred, and in case of packet losses the respective packets are retransmitted. In terms of QoS, emphasis is on user perceived throughput, usually averaged for the length of the session. Per-packet delay and delay jitter are unimportant as long as the total amount of data is delivered within a certain period of time. The most popular applications in this category are Hypertext Transfer Protocol (HTTP) and File Transfer Protocol (FTP). They are based on the Transmission Control Protocol (TCP)/IP protocol which offers reliable data transfer. TCP employs feedback control mechanisms to adapt the transfer rate to current network conditions that allow traffic on one link to share available capacity.

Elastic traffic is closed-loop controlled, with average rate and download time as the measures of performance. The main QoS indicator from the end user standpoint is adequate response time (directly proportional to average throughput in kbps or Mbps) in seconds.

This results in a natural division of a network into service classes. For example, for IP networks based on Ethernet technology, it is possible to define separate Ethernet Virtual Connections (EVCs) for each service class. Furthermore, wireless network operators' current engineering practices are to segregate real-time streaming traffic into conversational (class A) and IP Multimedia Subsystem (IMS) traffic (class B). Elastic traffic is segregated into buffered streaming (class C) and TCP/IP based WEB applications (class D). A given traffic class could require more than one EVC if the traffic justified it. The conversational class is reserved for "carrier grade" premium voice services, the IMS class applications are based on the UDP/IP protocol and the application could adapt to the network load conditions at the expense of quality degradation, the buffered streaming class is based on TCP/IP which provides a traffic flow regulation mechanism and class D is reserved for best effort (BE) applications.

One challenge in IP network traffic engineering has been to devise a bandwidth computation methodology to size the bandwidth allocated to each service class to efficiently accommodate different QoS requirements. While total network traffic may change relatively slowly over time, the per-class traffic mix may fluctuate both with time and destination. For example, in 3G mobile phone cellular networks, the traffic shifts as the mobile user negotiates the cellular region, from home to work and back. Also, mobile users generate mainly voice traffic, while home/work users access Internet applications. Given the number of network routing nodes, manual network reconfiguration is impracticable.

To date, automated methods that calculate bandwidth profile parameters that take into account per-traffic class SLSs have eluded network engineers as well as network operation centers. Current practices for IP networks rely on over-provisioning a single bandwidth partition (class) to ensure ad-hoc guarantees. For real-time streaming traffic, the over-provisioning ratio is typically 4:1 (25% efficient), and for elastic traffic, 2:1 (50% efficient).

The current generation of IP routers that are compliant with IETF DiffServ-TE, MEF specifications MEF 6, MEF 10.1, MEF 11 or IEEE PBB/PBT/PLSB frameworks support traffic class separation as well as bandwidth partitioning. For the purpose of discussion, routers sometimes referred to as carrier-grade routers will be denominated switch-routers. Switch-routers also support the RDM and MAM bandwidth management models.

A multimedia IP network must efficiently support many multimedia applications using a fixed set of service categories to support various SLSs and end user bit rate requirements.

There exists a need for a traffic engineering method that can accommodate increasing service demands without unreasonable and unpredictable investment in network infrastructure.

SUMMARY OF THE INVENTION

The inventor has discovered that it would be desirable to have network Traffic Engineering (TE) systems and methods that obviate network over-provisioning by engineering the QoS for each traffic class. Embodiments dimension LTE switch-router schedulers to ensure that each traffic class receives an appropriate QoS in terms of delay, packet loss ratio and throughput.

Embodiments calculate EVC bandwidth profile parameters with the IP layer protocol overhead included. Between two network end points, the EVC bandwidth profile parameters Committed Information Rate (CIR) and Peak Information Rate (PIR) are calculated for conversational (class A), IP Multimedia Subsystem (IMS) (class B), buffered streaming (class C) and interactive traffic (class D).

Embodiments implement in each network switch-router, a two-stage scheduler aligned with the DiffServ-TE framework. The first stage receives all elastic traffic flows (classes C and D). The first stage queue is modeled after a General Processor Sharing (GPS), Weighted Fair Queuing (WFQ) scheduler G/M/R. R is determined by the network operator policies regarding peak rate limits. The second stage inputs elastic traffic output from the first stage combined with real-time streaming traffic (classes A and B) and is placed in a second stage queue. The second stage queue output to a network link is determined by a priority scheduler that employs a multidimensional Markov chain. Elastic traffic rejected by the second stage priority scheduler is fed back to the first stage input.

Embodiments configure a predefined network's inventory of switch-routers to ensure that each traffic class A, B, C or D receives an appropriate QoS in terms of delay, packet loss ratio and throughput. The defined network may have hundreds of LTE switch-routers. By iterating the method over the entire network's LTE switch-routers, the network is provisioned to serve the combined traffic load for all traffic classes. Embodiments check that no capacity constraints are violated at each LTE switch-router and will reroute and/or open new traffic routes as required.

One aspect of the invention provides a Traffic Engineering (TE) method for a Long Term Evolution (LTE) multimedia IP network that obviates network over-provisioning by providing Quality of Service (QoS) to traffic classes. Methods according to this aspect of the invention include acquiring Key Performance Indicators (KPI) and predefined Service Level Specifications (SLSs), partitioning S1/X2 interfaces into a plurality of Ethernet Virtual Connections (EVCs), with each EVC supporting one traffic class, dividing the total capacity of each S1/X2 interface among the classes it supports, constructing a per-class traffic table for each LTE switch-router, comparing each LTE switch-router traffic table with a short term traffic forecast table for that LTE switch-router, if the comparison is a good fit, acquiring network S1/X2 link current bandwidth profiles for each EVC and if not a good fit, using smoothing filters to remove transitory peaks in an LTE switch-router's per-class traffic table, for each S1/X2 link EVC, calculating a Committed Information Rate (CIR) bandwidth and a Peak Information Rate (PIR) bandwidth for each traffic class, class aggregate and link aggregate basis, and if the S1/X2 link EVC per class CIR and PIR bandwidths satisfy equipment capacity constrains, installing the S1/X2 link EVC per class CIR and PIR bandwidths in their respective LTE switch-routers as part of the network configuration.

Another aspect of the invention provides a Traffic Engineering (TE) method for a Long Term Evolution (LTE) multimedia IP network that calculates a bandwidth profile parameter for defined IP multimedia network traffic classes. Methods according to this aspect of the invention include defining a set of Ethernet Virtual Connections (EVCs) for the network having elastic bandwidths, receiving network traffic measurements and network state information such as per class call blocking, for each network LTE switch-router: acquiring network Service Level Specifications (SLSs), acquiring a switch-router bandwidth profile, setting EVC bandwidths for each traffic class, reading defined network traffic class A and class B traffic, calculating a class A and a class B bandwidth, if the class A and class B calculated bandwidths comply with the SLS, setting Committed Information Rates (CIRs) and Peak Information Rates (PIRs) for the class A and B traffic, and if the class A and class B bandwidths do not comply with the SLS, recalculating the class A and B bandwidths, reading defined network traffic class C and class D traffic, calculating a class C and a class D bandwidth, and if the class C and class D bandwidths comply with the switching router SLS, setting Committed Information Rates (CIRs) and Peak Information Rates (PIRs) for the class C and D traffic, and if the class C and class D bandwidths do not comply with the switching router SLS, recalculating the class C and D bandwidths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
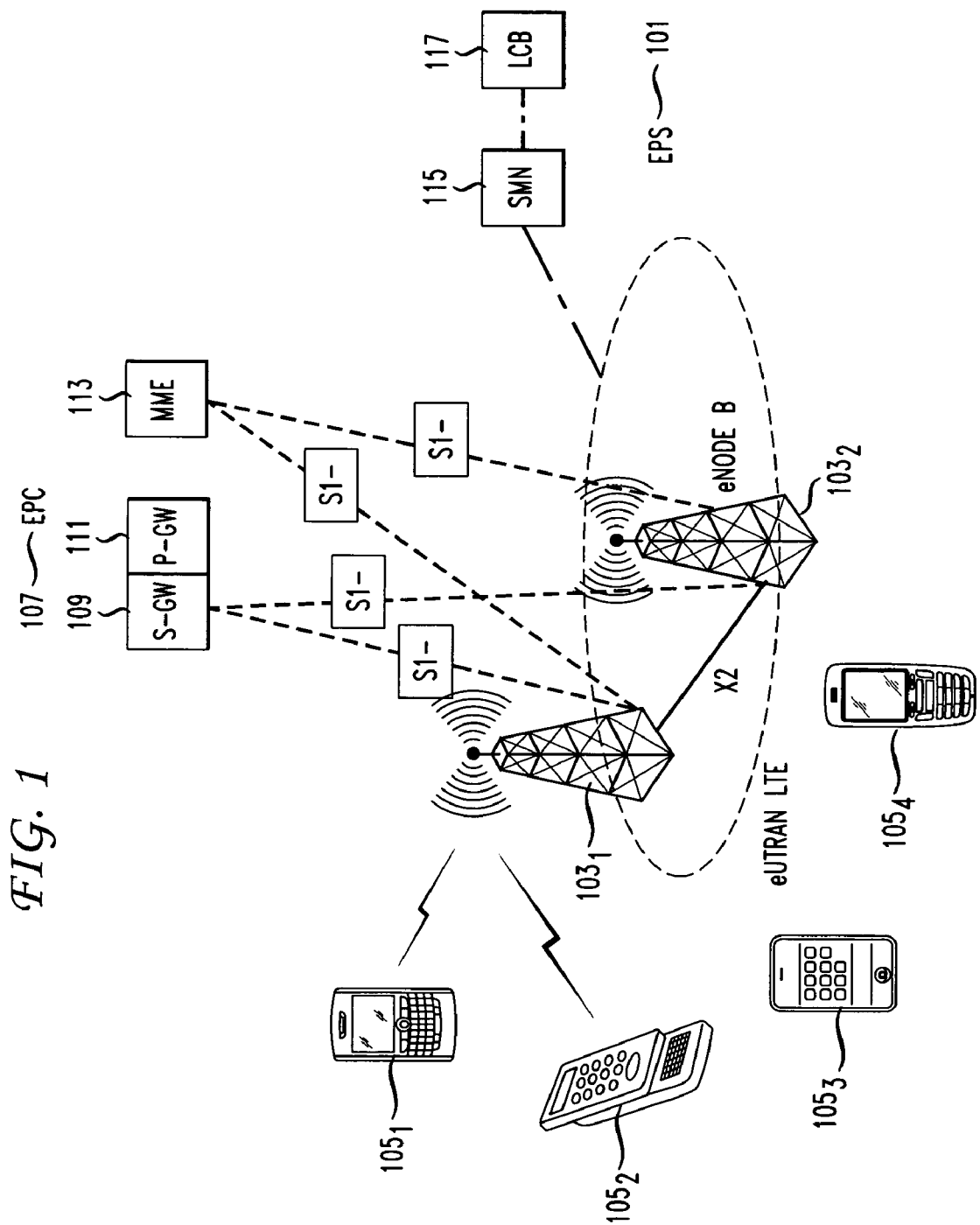
FIG. 1 is an exemplary multi-services IP network.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions that configure a network inventory of LTE switch-routers, calculate EVC bandwidth profile parameters Committed Information Rate (CIR) and Peak Information Rate (PIR) for four separate traffic classes A, B, C and D, and dimension each LTE switch-router scheduler as a two-stage queue to ensure that each traffic class receives appropriate QoS in terms of delay, jitter, packet loss ratio and sustained throughput. Components of the invention may be enabled as a modular framework and/or deployed as software as an application program tangibly embodied on a program storage device. The application code for execution can reside on a plurality of different types of computer readable media known to those skilled in the art. Embodiments may be implemented using Linux, Unix, Apple, Windows or other computer Operating Systems (OSs).

Embodiments configure an IP network which carries a plurality of predefined traffic classes with each traffic class having a distinct SLS requirement defined by the network operator.

Embodiments use operator forecasted traffic and measured values acquired from the network to compute CIR and PIR values for each traffic class, class aggregate, and link aggregate basis using a network control element 3GPP Long Term Evolution (LTE) Connection Broker (LCB) that acquires traffic measurement and network state information from each LTE switch-router via a Network Management System (NMS). To support current network operators practices, conversational (class A) and IMS (class B) may be aggregated into a real-time partition. Streaming (class C) and interactive (class D) may be aggregated into an elastic partition. Real-time and elastic partitions are aggregated to create the link total aggregate.

The LCB performs per class CIR and PIR calculations which are downloaded into each LTE switch-router scheduler to minimize local computation effort and maximize network efficiency.

FIG. 1 shows a 3GPP Evolved Packet System (EPS) 101 multimedia IP network. The network includes a plurality of access Base Transceiver Stations (BTSs) enhanced Node B (eNB) 103$_1$, 103$_2$ (collectively 103) communicating with a plurality of wireless user devices 105$_1$, 105$_2$, 105$_3$, 105$_4$ (collectively 105). In Universal Mobile Telecommunication Systems (UMTS), eNB denotes a BTS. An eNB uses Orthogonal Frequency Division Multiple Access (OFDMA) as the physical layer between a BTS and user device. As in all cellular systems, an eNB contains RF transmitter(s) and the receiver(s) used to communicate directly with the mobiles 105. The eNBs are interconnected using X2 transport links.

Call processing functions are distributed among Evolved Packet Core (EPC) node control elements 107. The EPCs 107 perform per-call control admission, per-call connection routing and the computation of service rate allocation QOS parameters. FIG. 1 shows only one EPC 107, however, each eNB 103 may be coupled to one or more EPCs 107.

Each EPC 107 includes a Serving Gateway (S-GW) 109, a Packet Data Network (PDN) Gateway (P-GW) 111 and a Mobility Management Entity (MME) 113. Each eNB 103 is coupled to one or more S-GW via an S1 interface. An S-GW 109 uses the P-GW 111 for connectivity to an external network. S-GWs 109 and P-GWs 111 ensure user traffic forwarding functions while per-call control plane functions are executed by the MME 113. As such, the MME 113 keeps track of call quality indicators like blocked calls, dropped calls, bandwidth throttling, etc.

Figure 5:
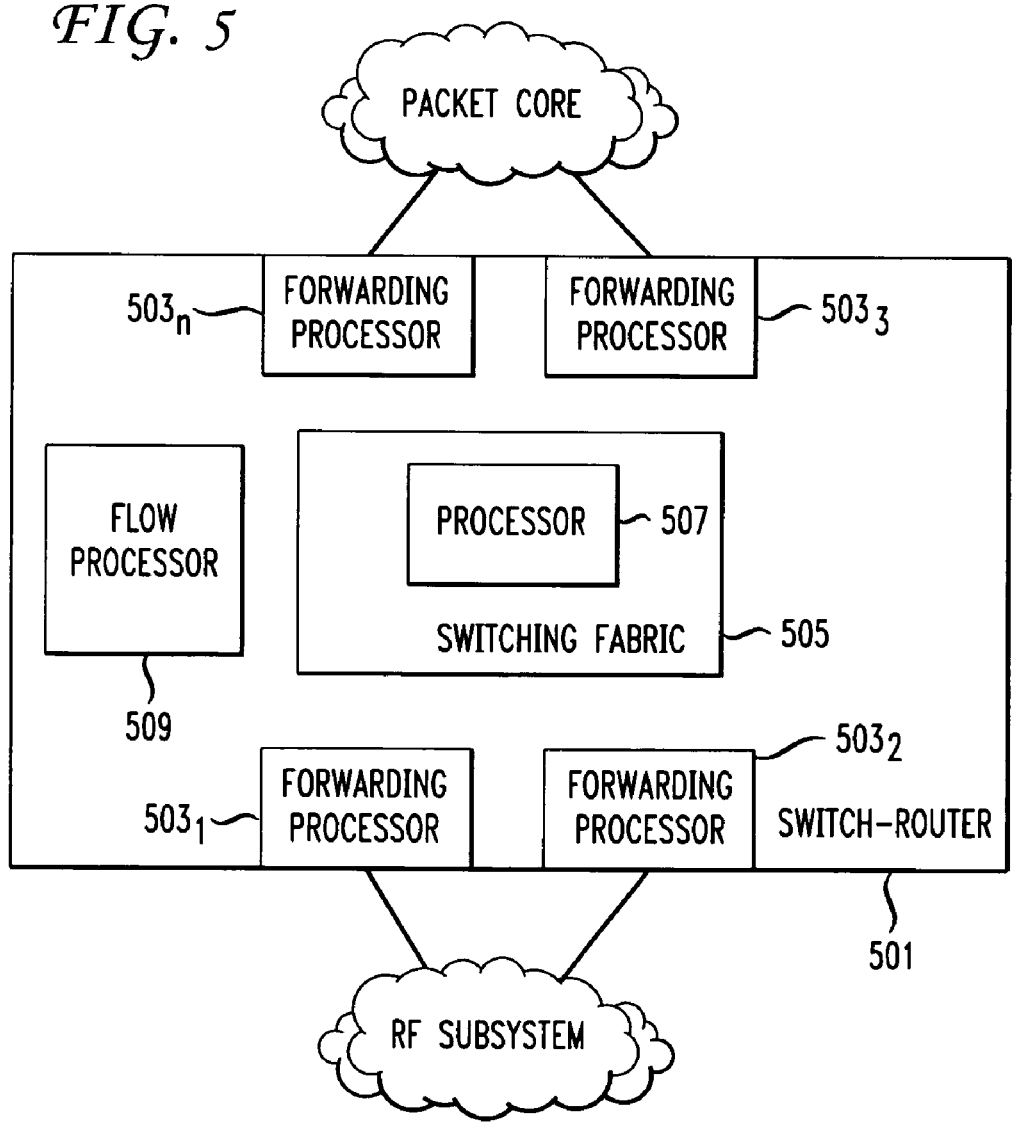
FIG. 5 is an exemplary diagram of a generic LTE switch-router as deployed at an eNB/EPC.

FIG. 5 shows a generic block diagram of an LTE eNB, S-GW, P-GW or MME, referred to as LTE switch-routers. Each LTE element is build around a high speed switch-router 501. It comprises one or more Forwarding Processors (FPs) 503$_1$, 503$_2$, 503$_3$, ..., 503$_n$ (collectively 503), each FP 503 having input and output packet forwarding processors (LTE schedulers), and a switching fabric 505 that interconnects all FPs 503. The switch-router also contains a routing processor 507 functioning as the central controller for the router 501. Distinctive to LTE switch-routers is the addition of a flow processor 509 that assist the LTE nodes to perform routing on a per call basis, also referred to as flow routing.

A flow is a single end-to-end activity over the network. Within a 3GPP network, a flow can be associated with a General Packet Radio Service (GPRS) Tunneling Protocol (GTP) instance. Rather than routing individual packets, a flow router observes and evaluates flows (GTP tunnels). This evaluation permits the FP 503 schedulers to prioritize GTP tunnel traffic as demanded by the application, to deliver the quality of service (QoS) requirements, and keep each flow class from consuming more than some pre-assigned portion of network resources.

The eNBs 103 are interconnected to an EPC 107 over S1 links. The S1/X2 links may use one of a number of different types of IP over Ethernet/Packet Over SONET/SDH (POS) transports. The S1/X2 links support peak transfer rates of several hundreds of Mbps.

The network 101 includes a Network Monitoring System (NMS) 115 which performs the functions of network topology/traffic acquisition and monitoring in addition to any Operations, Administration, and Maintenance (OAM)-Element Management System (EMS) functions. An LCB 117 is coupled to the NMS 115 and performs S1 and X2 interface size computations which produce periodic specifications for the bandwidth allocated to the S1/X2 links. The LCB 117 may be a workstation coupled to the NMS 115.

Figure 2:
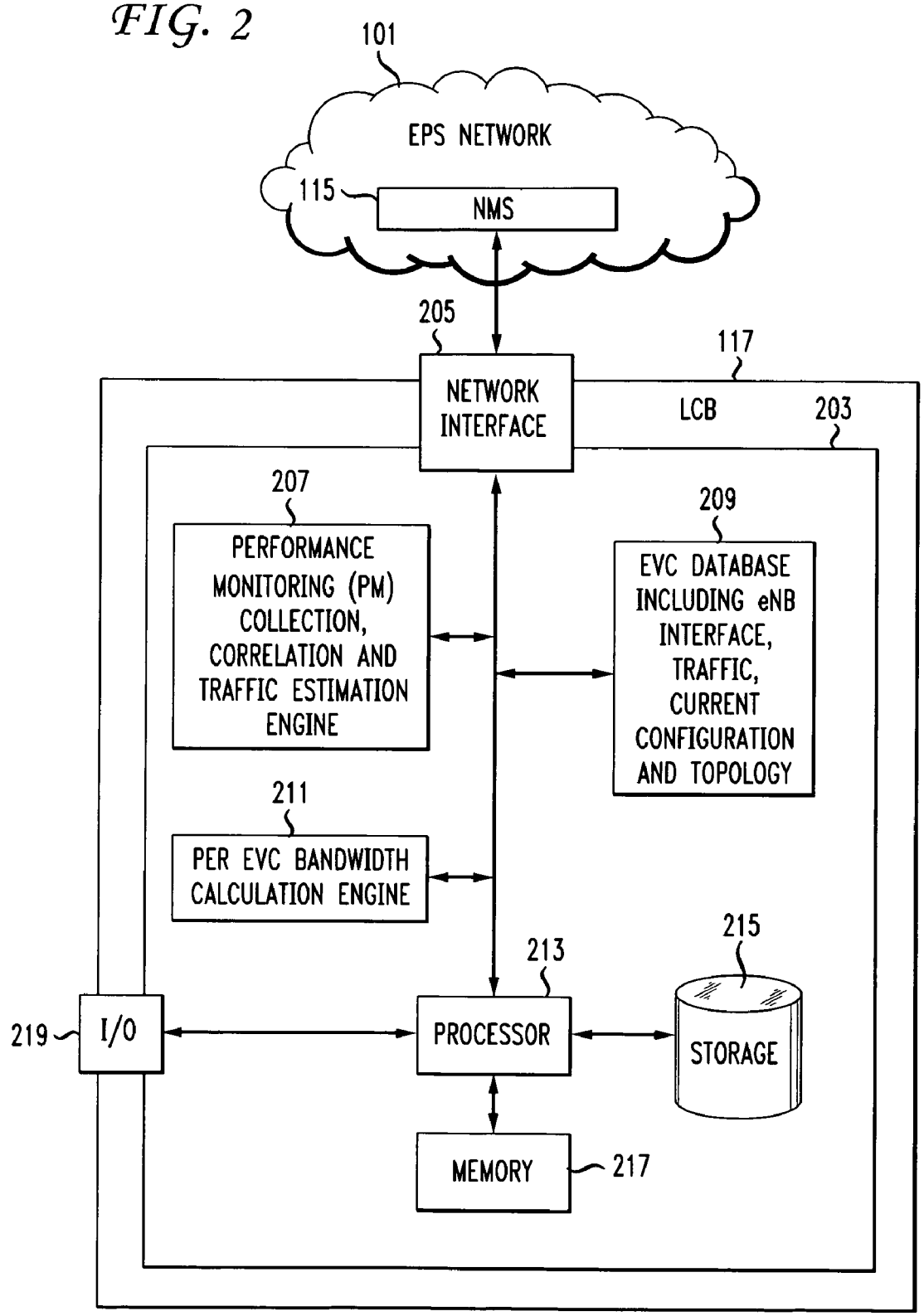
FIG. 2 is an exemplary traffic engineering system framework.
Figure 3:
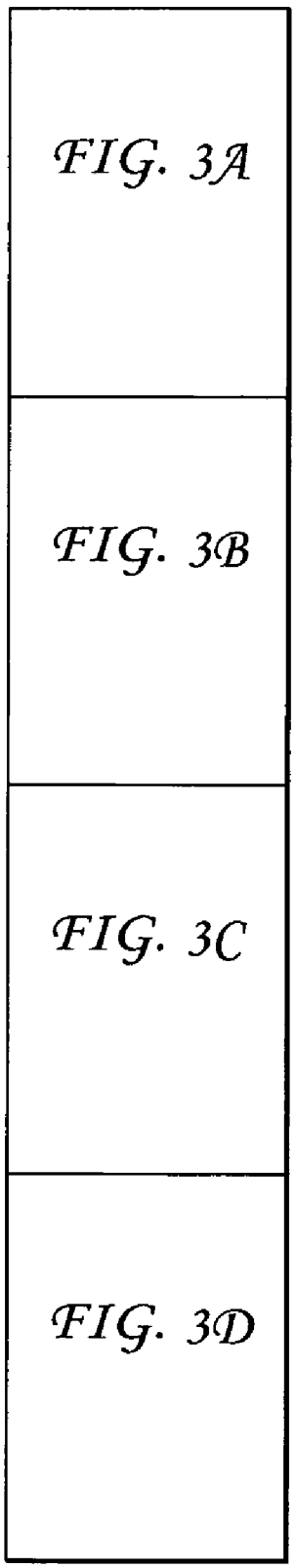
FIG. 3 is an exemplary network configuration method.
Figure 3A:
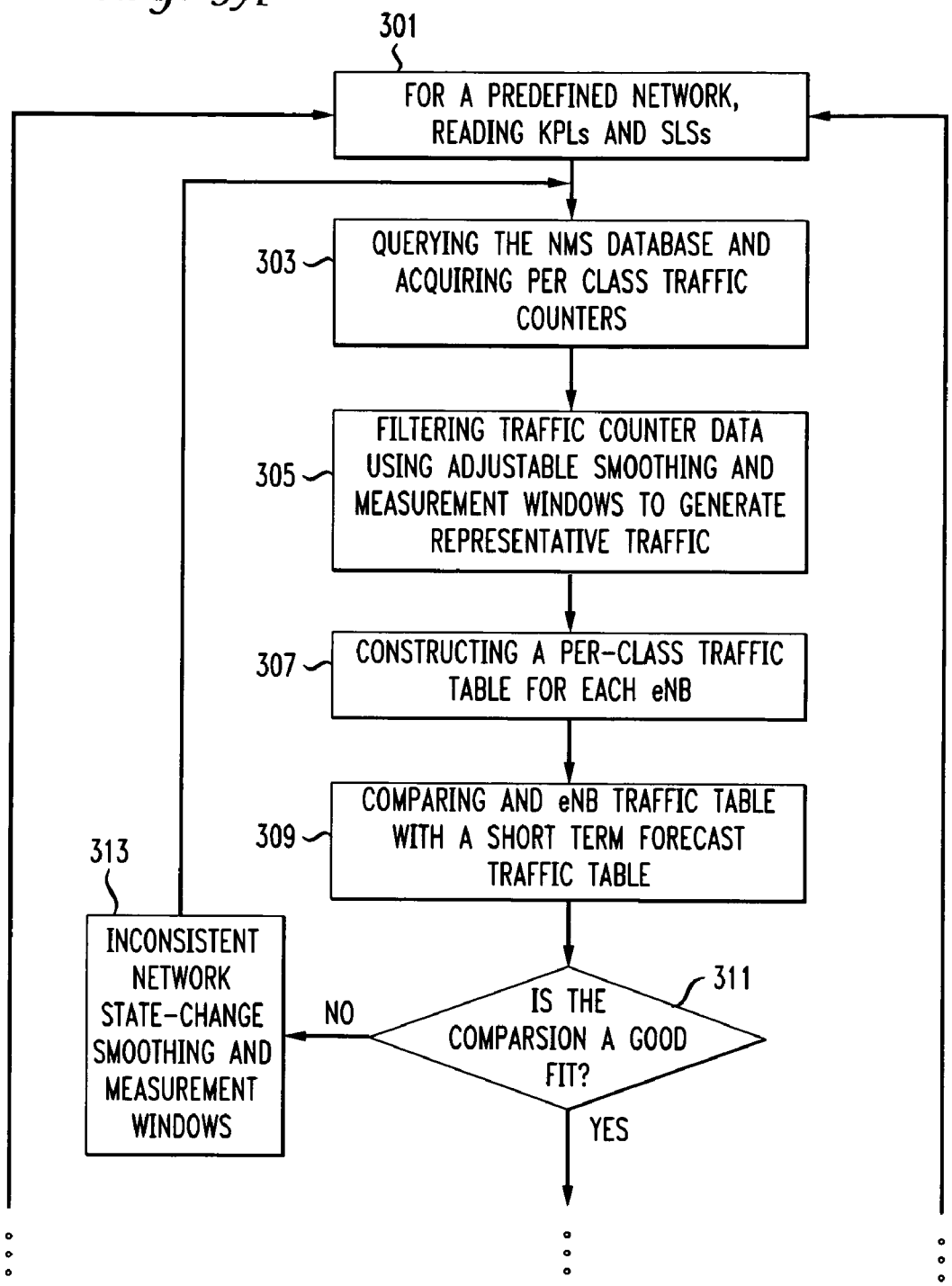
Figure 3B:
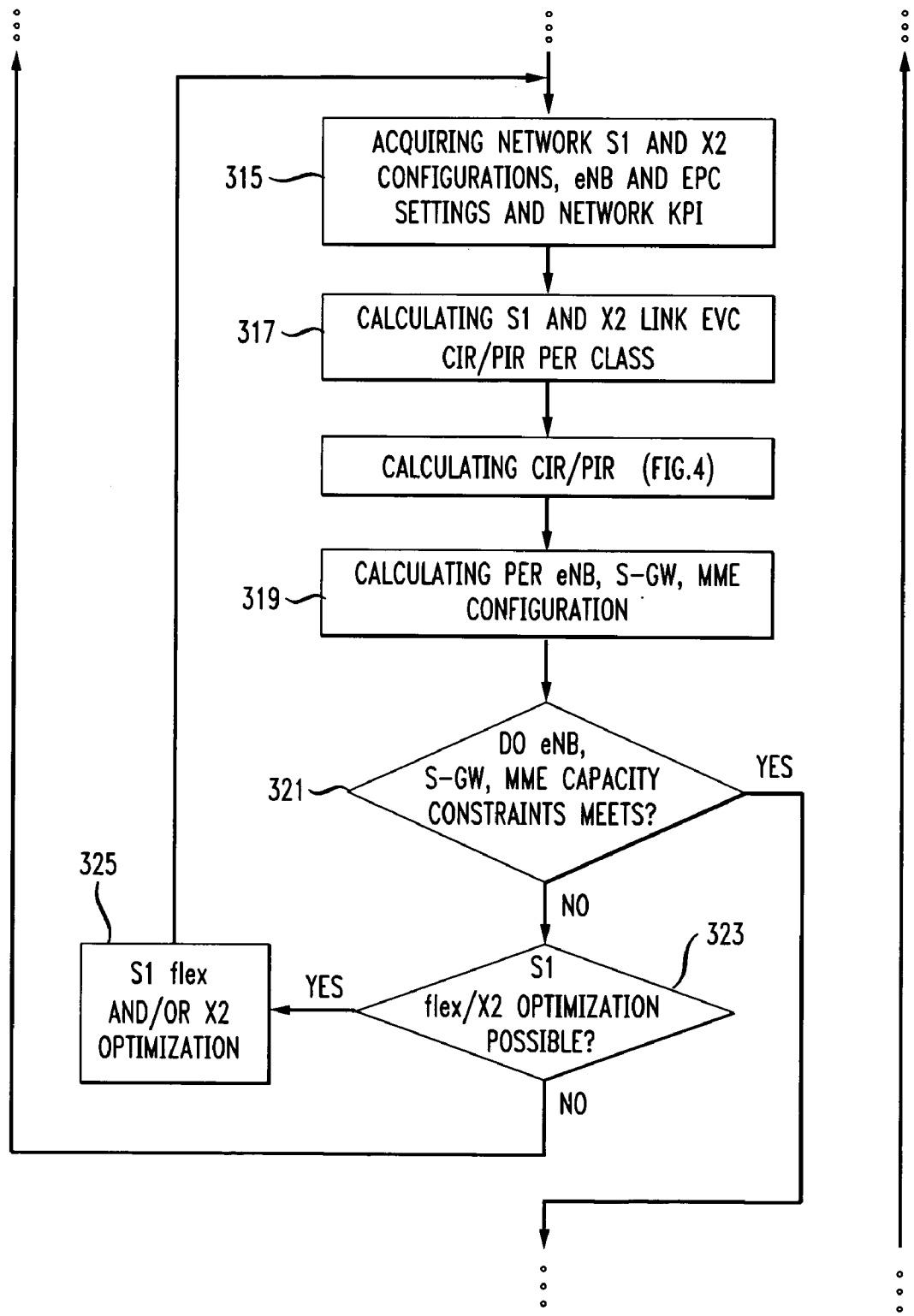
Figure 3C:
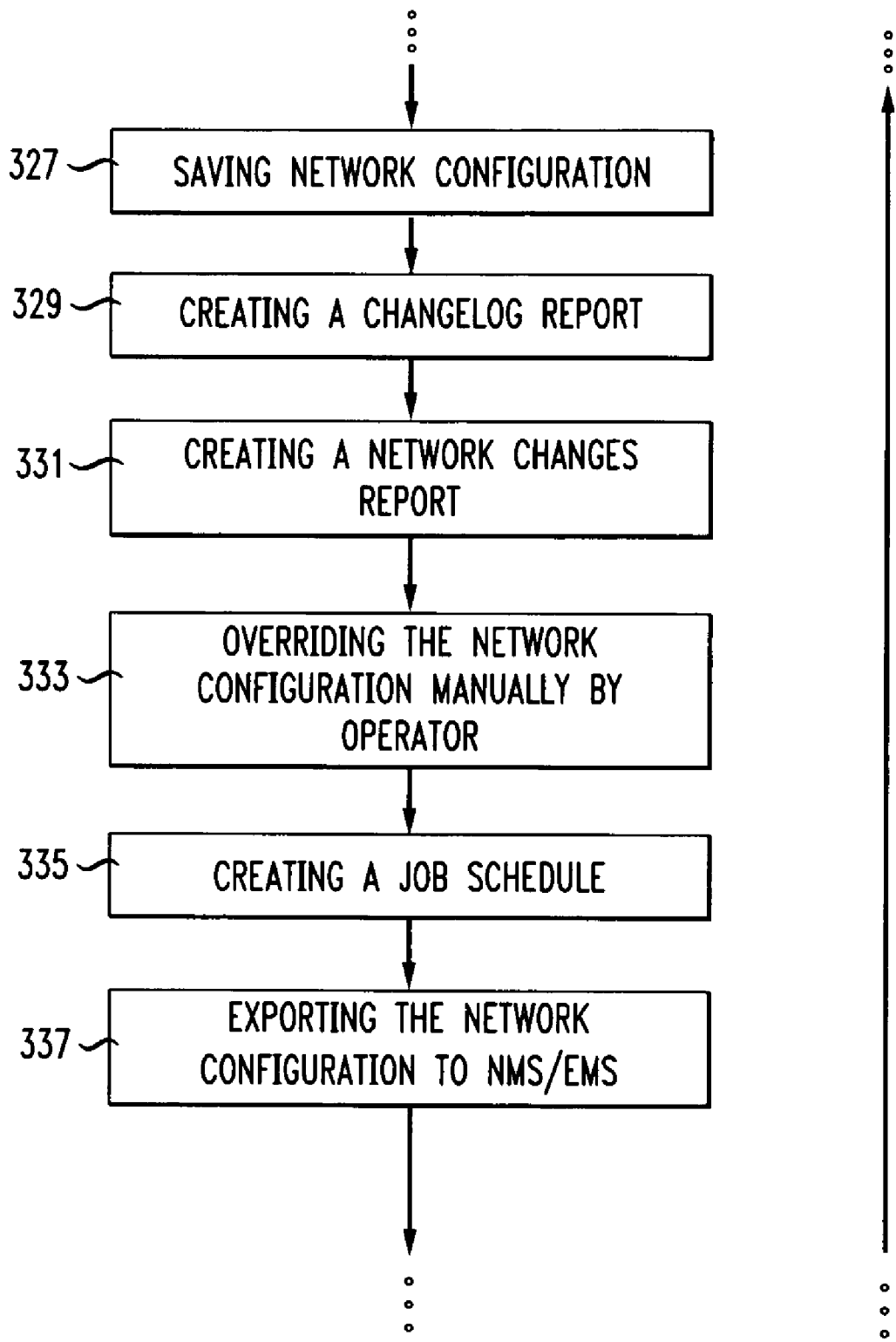
Figure 3D:
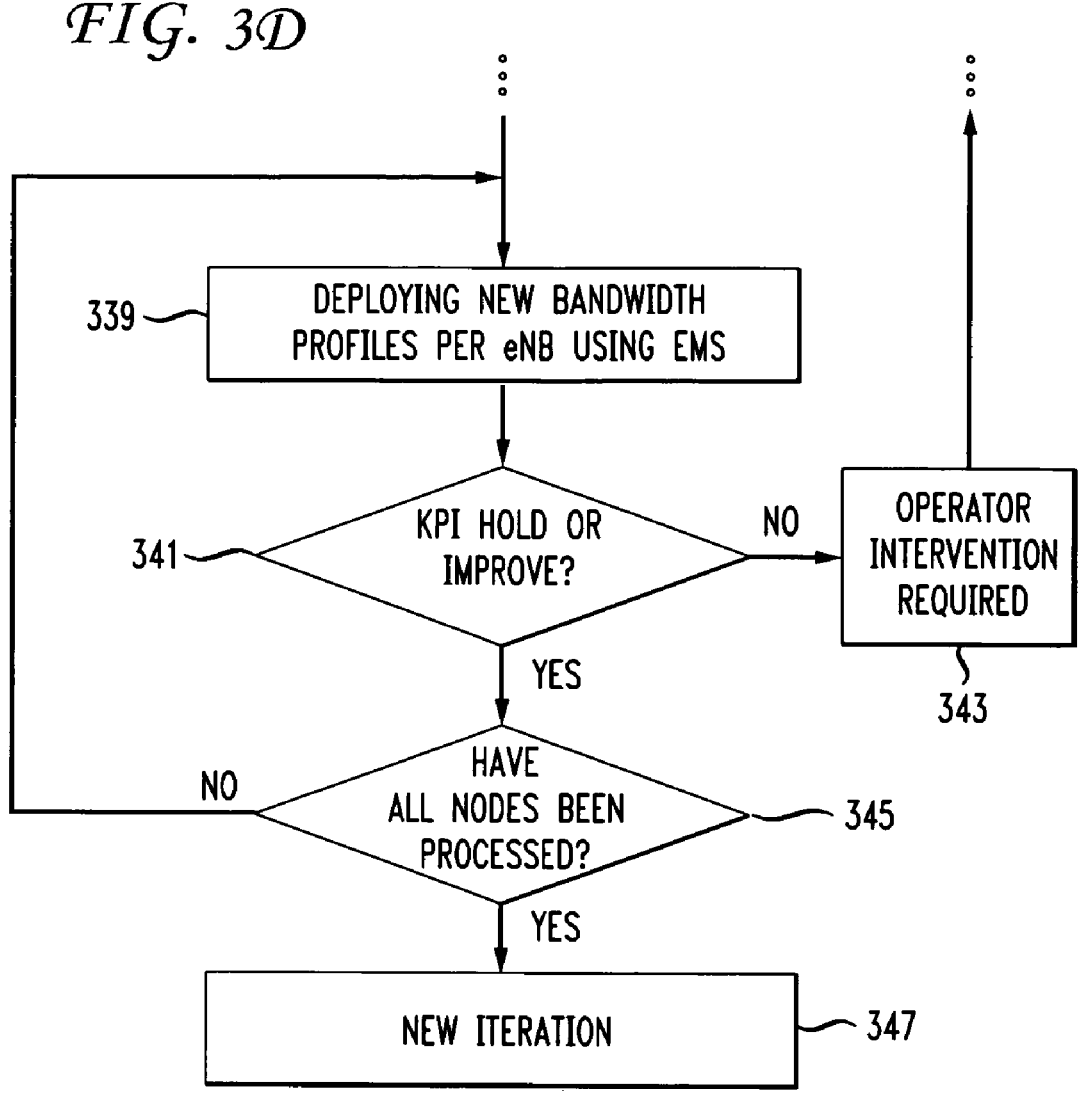

FIG. 2 shows an embodiment of an LCB 117 system framework 203 and FIG. 3 shows a network configuration method. The framework 203 which may be part of the NMS 115 or LCB 117 includes a network interface 205 coupled to the NMS 117 and configured to acquire network topology information, network traffic information, as well as network status information to perform traffic engineering. The network interface 205 is coupled to a Performance Monitoring (PM) collection, correlation, and traffic estimation engine 207, an EVC database 209 that includes eNB, interface, traffic and current configuration topology, an EVC bandwidth calculation engine 211 configured to generate appropriate sizes for S1/X2 links and a processor 213. The processor 213 is coupled to storage 215, memory 217 and I/O 219.

The framework 203 stores acquired network data into a data store 215. The framework 203 may be implemented as a computer including a processor 213, memory 217, storage devices 215, software and other components. The processor 213 is coupled to the network interface 205, I/O 219, storage 215 and memory 217 and controls the overall operation of the computer by executing instructions defining the configuration. The instructions may be stored in the storage device 215, for example, a magnetic disk, and loaded into the memory 217 when executing the configuration. The invention may be implemented as an application defined by the computer program instructions stored in the memory 217 and/or storage 215 and controlled by the processor 213 executing the computer program instructions. The computer also includes at least one network interface 205 coupled to and communicating with a network such as shown in FIG. 1 to interrogate and receive network configuration or alarm data. The I/O 219 allows for user interaction with the computer via peripheral devices such as a display, a keyboard, a pointing device, and others.

By iterating the method over all of the S1/X2 links coupling the eNBs 103 and EPCs 107, the entire LTE network is provisioned to serve the combined traffic load of all traffic classes. The calculation engine 211 checks that no capacity constraints are violated at each eNB as well as control nodes EPC 107 and will reroute/open new traffic routes as required.

The EPC 107 passes network state information to the NMS 115 to permit the LCB 117 to maintain topological awareness of the network 101 and its state. In addition to traffic data, each EPC 107 involved in traffic admission control may report to the LCB 117 via the NMS 115 the details of per call admission requests denied and the cause of admission failure. The report is typically performed at the class level.

To free computing resources in the multimedia network, a complete topological network map is maintained at the LCB 117. To ensure that the topological information is accurate and complete, each S1/X2 link is monitored by each eNB 103 at its end. If the status of an S1/X2 link changes, the change is reported by two nodes 103/107 to the NMS 115. The LCB 117 must retrieve the updated information from the NMS 115.

The network 101 carries traffic classes having different characteristics and SLSs. Per traffic class SLSs are difficult to meet without traffic segregation and network partitioning into EVCs.

Recommended operational practices for LTE networks are to define from two to four distinct traffic classes. Each traffic class is assigned to a bandwidth partition. SLSs for each traffic class are defined by the network operator. The system framework 203 queries the NMS 115 to acquire network Key Performance Indices (KPI) as well SLS (step 301). KPIs are stored in the database 209. Operator predefined SLSs can be retrieved from the NMS 115 or read as a configuration file to be stored into the database 209.

The LCB 117 acquires traffic measurement data as well network topology information from the NMS 115 (step 303). A network traffic measurement interval should be ideally 60 seconds or less, and may never exceed 900 seconds. A large measurement window will smooth peak values adding noise to the peak rate estimation. The NMS 115 acquires information for all eNBs 103. The LCB 117 queries the NMS 115 database to assemble a traffic matrix of the network 101. The matrix includes all S1 and X2 instances (all LTE switch-routers and all s1 and x2 links). The traffic measurement data is accumulated in appropriate tables and periodically processed in order to determine representative values. Processing includes filtering with a pre-programmed time window, e.g. 300 seconds, to smooth traffic peaks and obtain representative values to be used to calculate the Committed Information Rate (CIR) bandwidth parameter. Time windows are multiples of the measurement interval. The filtering window is specific to each traffic class and the end user may modify the default values to follow operational practices (step 305). Each class A, B, C and D has its own time window.

For each network LTE switch-router, a per-class traffic table is constructed (step 307) using per hour averages. The LTE switch-router traffic table is compared with the Network Operator short term traffic forecast table (step 309), if available. The short term forecast may be assembled by the system off-line. If the comparison between a measured traffic table and the short term operator forecast is not a proper fit (step 311), e.g. the measured traffic is much higher than the short term forecast, an incoherent network measurement is assumed (no convergence) and the measured per-class traffic table is reconstructed using additional data points, i.e. increasing the measurement window (step 313) as well modifying the smoothing window. An iteration is each time the traffic table is revised. The smoothing/measuring windows could be augmented until they reach the maximum (programmable) values. If no convergence is achieved, an alarm is raised to the NMS to signal a traffic congestion and the process continues with the measured values. The filtering window is the same as the averaging window.

Figure 4:
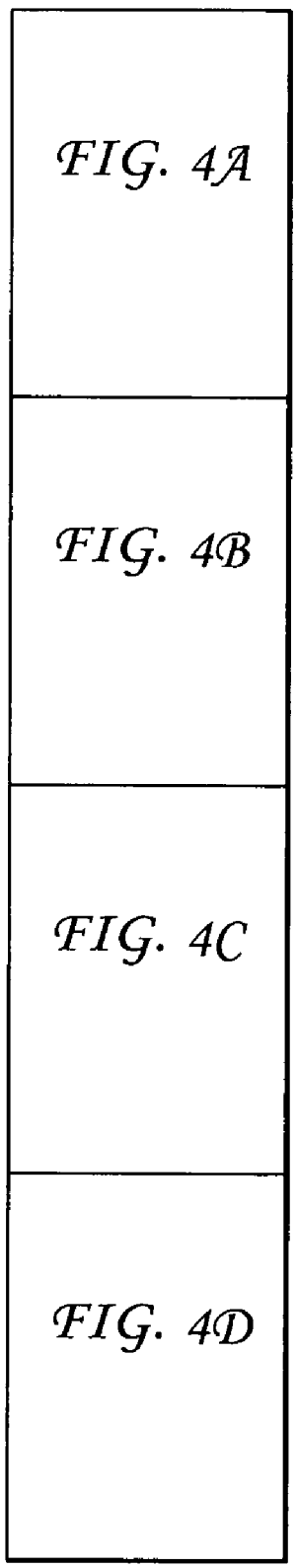
FIG. 4 is an exemplary CIR/PIR calculation method.
Figure 4A:
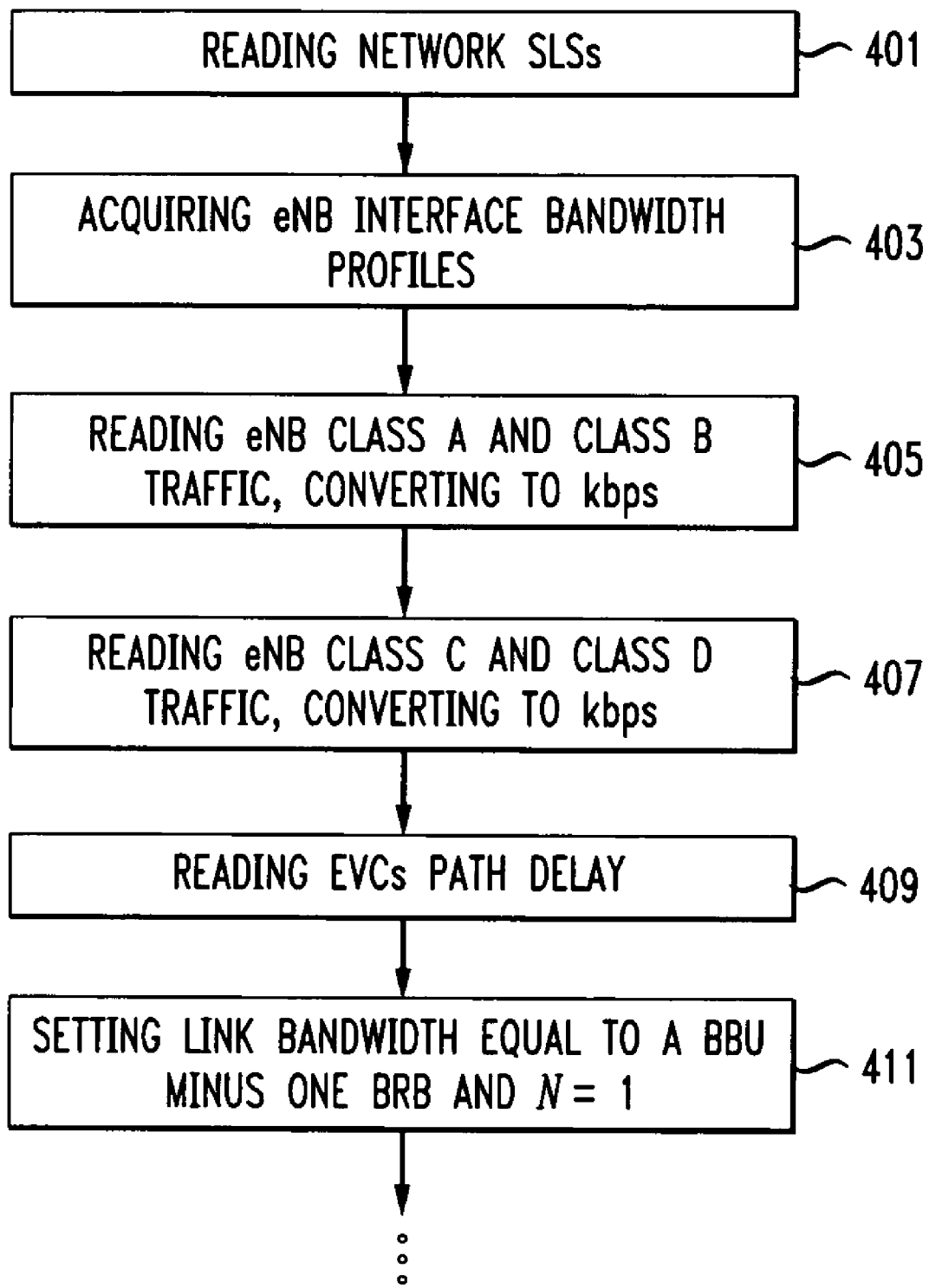
Figure 4B:
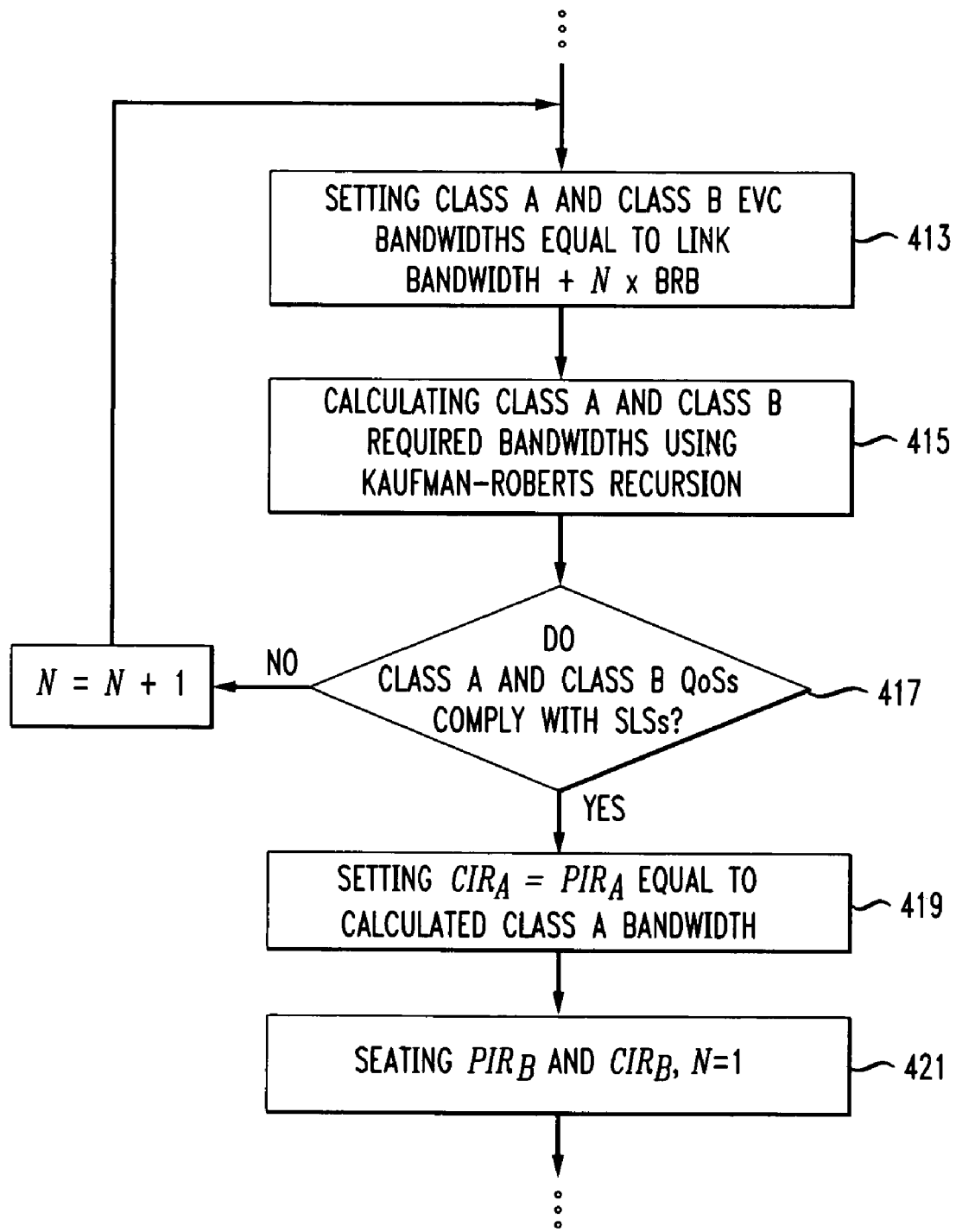
Figure 4C:
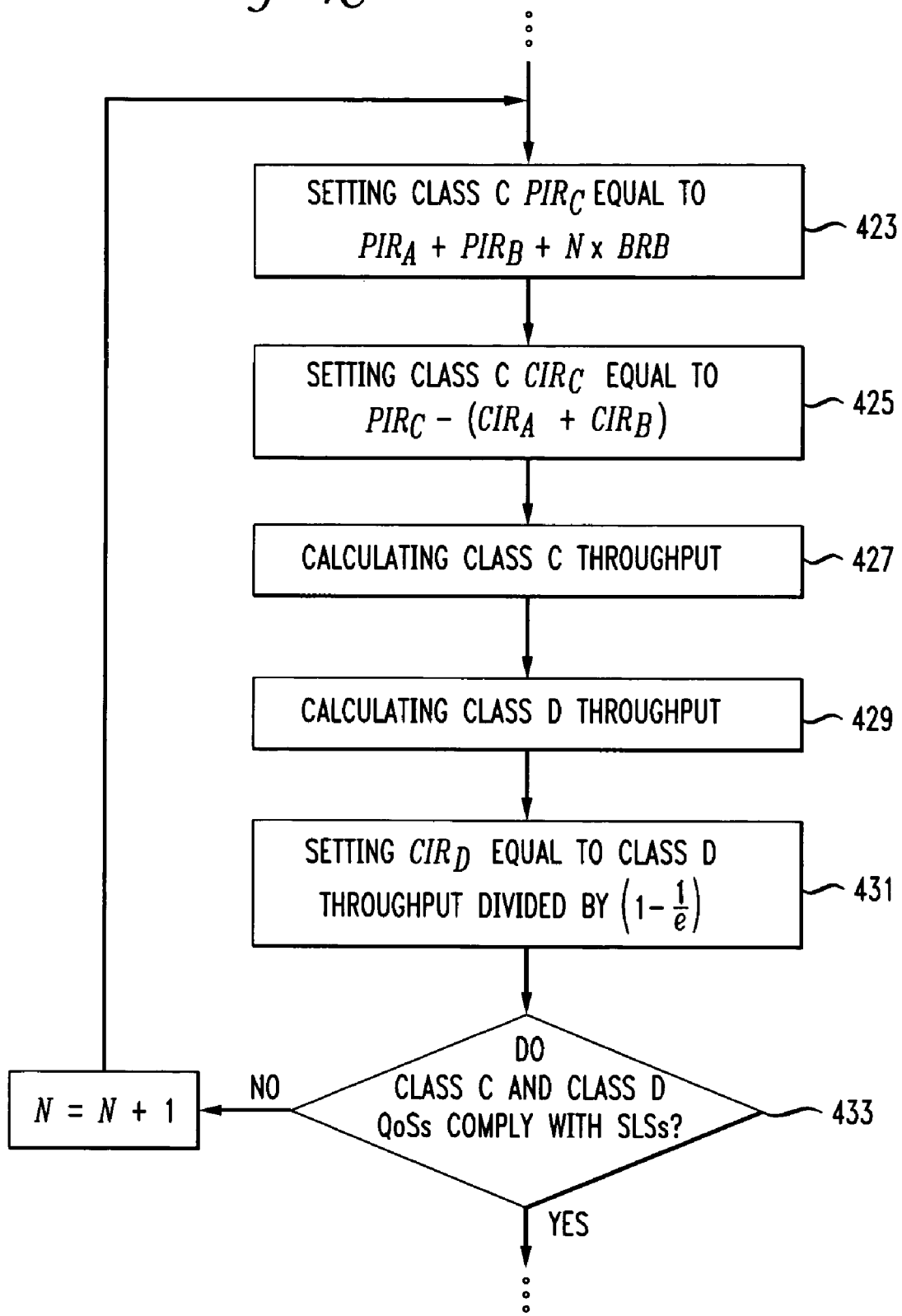
Figure 4D:
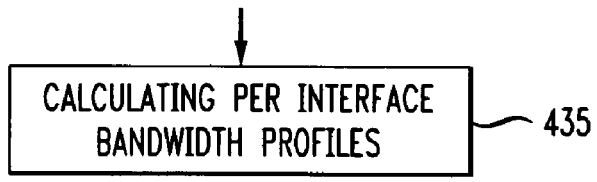

The LCB 117 retrieves S1 and X2 configuration and state information from each eNB 103 and EPC 107 (step 315) via the NMS. The EVC bandwidth profile parameters are calculated for traffic classes A, B, C and D (step 317). The network topology and traffic intensity are used by the LCB 117 to compute bandwidth profile parameters for all links between two LTE endpoints. FIG. 4 shows the bandwidth profile calculation method.

The network 101 supports a plurality of IP services which may require different PHBs. Each PHB may use one or more transport EVC. Embodiments implement a rate enforcement method comprising a guaranteed minimum rate CIR as well maximum peak rate PIR per traffic class (per EVC) to ensure efficient use of the network bandwidth while meeting a network operator defined SLS type for each traffic class. Each IP service (voice, streaming, FTP, etc.) is assigned to only one traffic class and each traffic class is assigned to one or more EVC in the network. The EVCs are dynamically configured by the LCB 117 with each EVC having an elastic bandwidth which fluctuates with traffic load. Unused bandwidth accepts traffic from any waiting source in a predetermined hierarchical order in which background traffic without a QoS is served last. EVC hierarchical order is predefined by the network operator via as part of the SLS.

Real-time traffic and elastic traffic have different service requirements. Real time communications such as voice are loss tolerant meaning that a certain number of packets may be lost without significantly annoying the service users, yet they are delay intolerant in that any delay or jitter in packet delivery is noticeable. Data transfers between computers is delay tolerant, but intolerant to packet loss. IP Multimedia System (IMS) applications like interactive videoconference (Video Share) are intolerant to delay, jitter and packet loss.

Traffic separation into separate EVCs is performed so each EVC corresponds to one and only one traffic class. The forwarding rules applied to a given class must be practiced across the network. In order to efficiently use the network 101, the bandwidth between EVCs must be elastic to permit EVC capacity to expand and contract in response to variations in network traffic load.

Network topology definition and network dimensioning, also referred to as network TE traffic engineering, are based on traffic measurements and forecast, SLSs (QoS) and economic considerations. Network TE is complex and algorithmically intensive and must take place in a continuous manner. Network TE involves traffic estimation using statistical techniques and capacity calculations using queuing models and optimization theory. Performance characterization is a function of traffic load, resource allocation and utilization. Effective network sizing computations may be based on traffic forecast as well feedback from performance measurements. The LCB 117 performs the network TE.

Embodiments divide the eNB 103 interface X1/S2 traffic into a manageable number of classes, whose definition depends on the SLS requirements of delay, jitter and packet loss. A given traffic class may include several flows of similar traffic or may represent a single connection which has a high bit rate requirement.

The S1/X2 interfaces of an eNB 103 are partitioned into a plurality of EVCs, each supporting one class of traffic. The total capacity of each S1/X2 interface is divided among the classes it supports. Different S1/X2 interfaces, for example X2 interfaces connecting to different eNBs, may be partitioned differently since the same mix of traffic is not necessarily transported over each interface. Different routing schemes and admission criteria may be applied to the various network EVCs. For example, a voice service class may use a simple routing scheme based on hop count to ensure bounded delay and jitter. In addition to the difference in routing and admission criteria, operational measurements, tariff setting and billing procedures may differ among the traffic classes.

To maximize transport efficiency and minimize network processing load, all traffic classes use EVCs through the network for routing. Classes that require guaranteed bit rates must perform capacity reservation and bandwidth reservation. An eNB LTE scheduler uses a rate enforcement algorithm to divide the interface capacity among the network traffic class EVCs. Per-class EVCs are sized in accordance with embodiments of the method.

As described above, eNBs 103 forward both real-time and elastic traffic. Real-time traffic is mainly composed of low bit rate flows which occur at high frequency, for example, voice calls or IMS video calls. High peak bit rate traffic which is requested at a low frequency is better characterized as elastic connections, for example, MP3 downloads and file transfers.

By appropriately engineering each EVC's class CIR and PIR, an LTE switch-router interface supporting EVCs with elastic boundaries will be as bandwidth efficient as a fully shared network interface while QoS differentiation is guaranteed.

An LTE switch-router main function is to perform packet forwarding as determined by the schedulers. Resources under the control of the scheduler are the input/output queue(s) of the switch-router. Service requests are packets that need forwarding arriving on input line(s). The policy includes information on how to classify packets as well as any constraints on routing and forwarding. The flow processor 509 takes into account information provided by the forwarding processors 503.

The main function of the scheduler is to make decisions regarding the order in which a service request should be allowed access to resources. It has a secondary function which is to manage the service queues. This secondary role reflects that in the face of excessive service requests, the finite resources of a server must be managed in a way that is consistent with the policy that is established at the server.

Consider N flows arriving at an LTE switch-router scheduler so that the traffic rate of connection n ($1 \leq n \leq N$) is $\lambda_n$, where $\lambda_n$ is the arrival rate of new traffic. If flow n has a mean service rate of $\mu_n$, then the mean utilization of a link by flow n, $\rho_n$, is $$\frac{\lambda_n}{\mu_n} \cdot q_n$$

is the mean waiting time due to the scheduler for the packets of flow n. According to the theorem, the scheduler is work conserving if $$\Sigma \rho_n q_n = C, \qquad (1)$$

where C is a constant value. (1) is the Kleinrock conservation law which states that any improvement on the waiting time of a given flow will result in a service deterioration for another flow.

In Priority Queue (PQ) scheduling, K queues are established, numbered 1, 2, . . . , K. Lower numbered queues are serviced before higher numbered queues since they have higher priority. A lower priority queue will only be serviced if there are no packets awaiting service in a higher priority queue. This means that busy higher priority queues could prevent lower priority queues from being serviced. A situation known as starvation.

In LTE switch-router embodiments based on Generalized Processor Sharing (GPS) scheduling, all incoming flows are serviced in a round robin manner. Any LTE switch-router used by network operators implements a WFQ-like scheduler to forward, traffic classes C and D.

Figure 6:
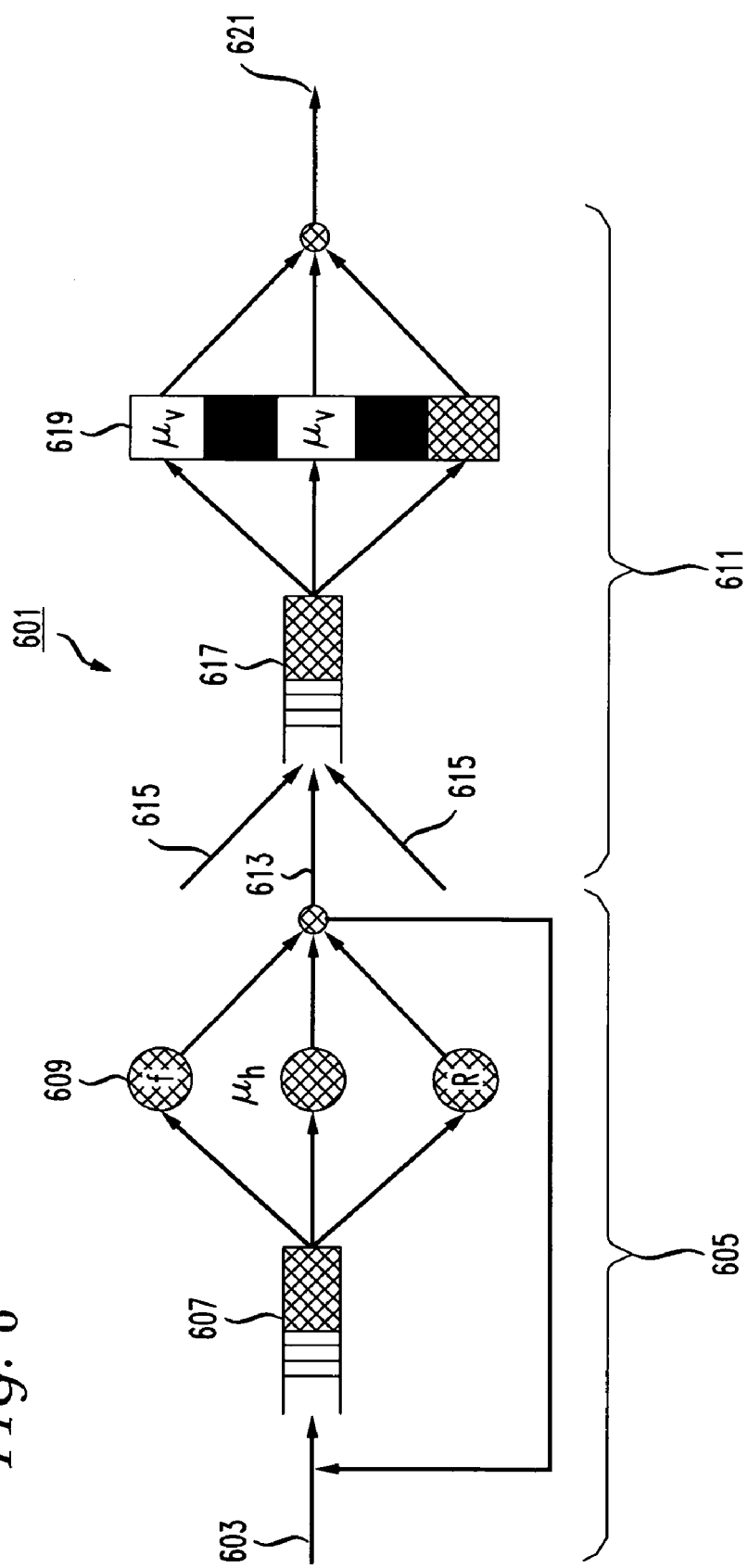
FIG. 6 is an exemplary two-stage LTE switch-router scheduler.

FIG. 6 shows an embodiment of a LTE switch-router LTE scheduler 601. The scheduler 601 is hierarchical, featuring a rate based scheduler for elastic traffic that require probabilistic guarantees subtending an emission queue based on priority scheduler. Elastic traffic is input 603 in a first stage 605 queue 607 which follows a general processor sharing, WFQ scheduler discipline 609 modeled via G/M/R. The second stage 611 is coupled to the output of the first stage 605 and first stage elastic traffic output 613 combines with real-time streaming traffic 615 input to the second stage 611 and is placed in a second stage queue 617. The second stage 611 queue 617 follows a K priority scheduler discipline with preemption 619 modeled via a multidimensional Markov chain and output 621. Elastic traffic rejected by the priority scheduler 619 is fed back 623 to the WFQ input 603, to account for Layer 2 and 3 packet loss and flow control. CBQ may be used by the first 605 and second 611 stage schedulers, with weights proportional to EVC bandwidth.

Defining the traffic characteristics for real-time flows is complex. The problem associated with the description of such services, from the packet networks standpoint, comes from the necessity of servicing various types of traffic sources such as voice, compressed voice, audio streaming, video, etc. The classification problem of real-time flows is solved by distinguishing Constant Bit Rate (CBR) flows and Variable Bit Rate (VBR) flows.

The CBR flows have a defined peak information rate value, while the VBR flows require a greater number of parameters to describe their streams. CBR sources include G.711 packetized voice, Motion Picture Experts Group (MPEG) 2 Transport Stream (TS) as well QuickTime CBR encoded multimedia. User Datagram Protocol (UDP)/IP based applications like IP Multimedia System (IMS) based applications are example of VBR sources.

To characterize the load introduced into the network by a CBR or VBR source, the Equivalent Bit Rate (EBR) concept is introduced. For example, for Adaptive Multi-Rate (AMR) voice within UMTS networks, the EBR takes into account the bit rate output from a codec (12.2 kbps) protocols' overhead (~60%) and the on/off activity cycle which may be typically 50/50. The EBR for an AMR voice call is approximately 16 kbps. For an H.264 Common Intermediate Format (QCIF) QuickTime video clip or VoIP (G711 codec) IMS services, the EBR is approximately 160 kbps (10 (16 kbps)).

The network bandwidth required to sustain a streaming flow is approximated via a multiple of a predefined bandwidth value—the Bandwidth Resource Block (BRB). For Synchronous Optical Networks (SONET) based services, the BRB is defined as a DS0 channel, 64 kbps. For a Groupe Special Mobile (GSM) packet network, it is assumed that the BRB is the greatest common divisor of the equivalent bandwidths of the different flows offered to the system, the BRB is defined as 1 kbps, whereas for LTE networks, the BRB as dictated by the OFDMA modulation scheme is 16 kbps.

LTE switch-router interfaces carrying a mixture of different multi-rate traffic flows that can be modeled via a full availability group model. The full-availability group is a discrete queuing model that uses complete sharing policy which is that a given flow could access all available bandwidth. This system is an example of a state-independent system in which the passage between two adjacent states of the process associated with a given class flow does not depend on the number of busy BRBs in the system. In the case of the full-availability group carrying multi-rate traffic flows, the multi-dimensional process can be reduced to a one-dimensional Markov chain. Such a reduction is the basis for the determination of occupancy distribution in the full-availability group by means of simple recurrent formulae.

V is defined as the capacity of the system in Bandwidth Resource Blocks (BRB). The system services m independent classes of Poisson traffic flows having intensities $\lambda_1, \lambda_2, \ldots, \lambda_m$. The holding time or duration for the flows of particular classes has an exponential distribution with parameters $\mu_1, \mu_2, \ldots, \mu_m$. The class k flow requires $L_k$ (BRB) to set up a connection ($L_k$ corresponds to the load $L_j$ generated by the user of a j class connection). The mean traffic $a_k$ offered to the system by the class k traffic flow is equal to $$a_k = \frac{\lambda_k}{\mu_k}. \tag{2}$$

In the full-availability group model, the resulting Markov chain can be described by the Kaufman-Roberts recursion $$nP(n) = \sum_{k=1}^{m} a_k L_k P(n - L_k), \tag{3}$$

where P(n) is the state probability in the multi-rate system. The blocking probability $b_k$ for the class k traffic flow is $$b_k = \sum_{n=V-L_k+1}^{V} P(n). \tag{4}$$

A packet network interface forwarding elastic traffic is modeled as a processor sharing queue, which offers its service to several customers by sharing the link bandwidth. All active jobs are served quasi-simultaneously by assigning time slots to each of them and processing them sequentially. Described in terms of file transmission, this is interpreted as simultaneously transmitting files over one link by breaking them into smaller pieces (packets) and transferring the pieces sequentially.

Depending on whether one flow is able to use the total link capacity on its own, the system is described either by an M/G/1 PS or an M/G/R PS model. Queuing models represented using Kendall's notation are A/B/S/K/N/Disc, where A is the inter-arrival time distribution, B is the service time distribution, S is the number of servers, K is the system capacity, N is the calling population, and Disc is the service discipline assumed. The last members are typically omitted so the notation becomes A/B/S and it is assumed that K=∞, N=∞ and Disc=FIFO.

In case the attainable transfer rate of one connection is limited to a peak rate $r_p$, a shared link appears like a system with R servers where $$R = \frac{C}{r_p}, \tag{5}$$

which is the ratio between the link rate C and the peak source rate $r_p$. Up to R flows can be served at the same time without rate reduction imposed by the system. If $r_p$ is larger than the link capacity the M/G/R PS model reduces to the simple M/G/1 PS model. For the M/G/R PS model, the expected sojourn time (transfer time) E{T(x)} for a file of size x is $$E_{M/G/R}\{T(x)\} = \frac{x}{r_p}\left(1 + \frac{E_2(R, R_p)}{R(1-\rho)}\right) = \frac{x}{r_p} f_R \tag{6}$$

Current engineering practices for LTE networks do not limit the maximum rate that a given user can request, accordingly, the M/G/1 queue must be used. The average throughput for the M/G/1 queue γ may be calculated using $$\gamma = \lim_{n\to\infty} \left[ \left(\frac{1}{n}\right) \sum_{k=1}^{\infty} \left(\frac{v_k}{s_k}\right) \right]. \quad (7)$$

This can be evaluated via the following approximations $$\theta = \frac{E(V)}{E(S)} = C(1-\rho), \quad (8)$$

$$\sigma = \lim_{t\to\infty} \left[ \frac{\left[ \int_0^t \left(\frac{1}{N(u)}\right) \left(\sum_{k=0}^{\infty} r_k\right) I(u)\,du \right]}{\int_0^t I(u)\,du} \right], \text{ and} \quad (9)$$

$$\sigma = \frac{c\left[(1-\rho)\ln\left(\frac{1}{1-\rho}\right)\right]}{\rho}, \quad (10)$$

where $\theta \leq \gamma \leq \sigma$, i.e. user experienced throughput is bounded by $\theta$ and $\sigma$. $\gamma$ is the average throughput, $V_k$ is the volume in bytes of the k transfer request, $S_k$ is the transfer time of the k transfer, $r_k(t)$ is the transfer rate for k transfer at time t, N(t) is the number of ongoing transfers at time t, C is the link capacity in kbps, and $I(u)=I_{\{N(u)>1\}}$ is the time interval with an outgoing transfer.

The effective bit rate for a TCP/IP based flow is impacted by the total packet loss as well end-to-end Round-Trip Time (RTT) delay according to the following TCP steady-state throughput equation by J. Padhye, where p is the packet loss, RTT is the Round-Trip-time, $W_{max}$ is the TCP Maximum Congestion Windows (64 Media Stream Share (MSS), 64 kbytes), b are the number of packets that are acknowledged by a received ACK, $T_0$ (1, 64, or the default 3 seconds) is the timer before retransmission attempt in case of three duplicate ACK reception, and B(p) in packets/second is the average number of TCP packets per unit time $$B(p) = \frac{W_{max}}{RTT}, \text{ for } p = 0, \quad (11)$$

$$B(p) = \frac{1}{RTT\sqrt{\frac{2bp}{3}} + T_0 \min\left[1, 3\sqrt{\frac{3bp}{8}}\right]p(1+32p^2)}, \quad (12)$$

for small $p > 0$, and $$B(p) = \frac{1}{64T_0}, \text{ for } p \to 1. \quad (13)$$

For each eNB S1/X2 interface, the calculation engine 211 reads the SLSs as well the available bandwidth in Bandwidth Basic Units (BBUs) in Mbps from the LCB database 209 (step 401). The current eNB S1/X2 bandwidth profiles are acquired from the EVC database 209, hence the <CIR, CBS, EIR, EBS, CF, CM> set of parameters for each EVC on a given interface (step 403). The calculation engine 211 reads conversational class A and IMS class B traffic values from the EVC database 209. Class A and class B traffic in Erlangs, is converted to kbps using $$kpbs = Erlangs \times EBR \quad (14)$$

(step 405). The calculation engine 211 reads the streaming class C and interactive class D traffic from the EVC database 209. Traffic in Mbytes is converted to kbps using $$kbps = Mbytes \times \frac{8}{3.6} \quad (15)$$

(step 407). Per EVC path delay is read from the database 209 (step 409).

The Kaufman-Roberts recursion is used to calculate the bandwidth allocated to aggregated conversational class A plus IMS class B $BW_{A+B}$. At least one EVC is provisioned for conversational class A traffic. An operator may deploy multiple EVCs for conversational traffic to implement load sharing protection as well as to cope with flow identifier limitations like IP port constraints. The calculation is initiated by setting as an initial condition the EVC bandwidth equal to a BBU selected by the operator minus one BRB (step 411). Iterations increment the EVG bandwidth one BRB (step 413). Traffic class A and class B bandwidths are calculated using the Kaufman-Roberts recursion (step 415). The traffic class A and B QoS are compared with their SLSs for compliance and the iteration stops when their actual QoS are equal to or greater than the SLSs (step 417).

At least one EVC is provisioned for conversational class A traffic. The peak information rate $PIR_A$ for the class A EVC is set equal to the bandwidth required for that class per the above-described method (step 419). The $PIR_A$ bandwidth can be divided into more than one EVC. The EVC DiffServ transfer class is EF.

At least one EVC is provisioned for IMS class B traffic. The class B EVC transfer class is AF with $PIR_B = BW_{A+B}$. If $$EBR_B = BW_{A+B} - PIR_A, \quad (16)$$

then the class B EVC $CIR_B$ is equal to $$CIR_B = (EBR_B) \frac{BW_{A+B}}{[2BW_{A+B} - (EBR_B)]}. \quad (17)$$

(step 421).
The class C EVC $PIR_C$ and $CIR_C$ is $$PIR_C = (PIR_A + PIR_B + N \times BRB), \text{ and} \quad (18)$$

$$CIR_C = PIR_C - (CIR_A + CIR_B) \quad (19)$$

where $PIR_C$ is rounded up to a BBU multiple (steps 423, 425). The M/G/1 PS Generalized Processor Sharing (GPS) (M/G/1 GPS) with feedback is used to calculate class C expected throughput, according to (10), for the current assigned BW $CIR_C$ and traffic in Mbytes (step 427).

The traffic class D desired throughput is set equal to the value calculated by (12) where the packet loss probability p is equal to the blocking value for class D traffic. This step ensures that the system will not decrease the class D bit rate (step 429).

One EVC is provisioned to route background traffic class D. The class D $CIR_D$ is set equal to the class D desired Throughput divided by $$\left(1 - \frac{1}{e}\right),$$

where e is the natural log base 2.71828 (step 431). $PIR_D$ is set equal to $PIR_C$.

A check is performed if the SLS for class C are satisfied. If the SLS is not satisfied, the value of N is incremented, to augment the committed information rate $CIR_C$, until the calculated throughput (10) exceeds the operator defined value (step 433).

If the class C SLSs are satisfied, the bandwidth profile for the interface is calculated as $$CIR = CIR_A + CIR_B + CIR_C + CIR_D, \text{ and} \quad (20)$$

$$PIR > \max(PIR_A, PIR_B, PIR_C, PIR_D). \quad (21)$$

Per LTE switch-router bandwidth profiles are calculated (step 435).

The above process is iterated over all eNB S1/X2 instances as well any and all eNB. Since the endpoint for the S1 interface is an S-GW, the process also engineers the S-GW.

For each eNB as well as S-GW interface, the system verifies bandwidth availability. The computed bandwidth profiles are distributed to the eNB 103 and EPC 107 LTE switch-routers. The EVC traffic class PIR and CIR bandwidth parameter profiles are calculated using current conditions and may be overwritten to adapt to future traffic conditions (steps 321, 323).

The system verifies that SLSs as well capacity constraints are satisfied for all interfaces as well LTE nodes. If a given S-GW/MME capacity constraints are exceeded, the system will attempt to rebalance traffic load by diverting more traffic to the less loaded nodes (step 325).

If the capacity constraints and SLSs are met, the network configuration is saved (step 327). A report acknowledging the configuration may be issued (step 329).

If the operator has configured the system to execute manual override, a network changes report is generated (step 331). The system then will read the proposed override and verify that the manual changes do not violate any SLS or capacity constraints (step 333). The system will create a job schedule (step 335) to be exported to the NMS.

The configuration is exported from the LCB 117 to the NMS/EMS 115 for implementation (step 337) and is rolled out incrementally (step 339). As it becomes operational, the KPIs are as reported by the LTE EMS are monitored for improvement (step 341). If the KPIs deteriorate the system will raise and alarm to inform the operator (step 343). The job schedule is examined to see if all network changes have been made (step 345). Upon job schedule completion, the system is ready to start a new iteration, i.e. collecting counters, configuration, running bandwidth profile calculations and so on (step 347).

The invention provides a multimedia network which is capable of efficiently transmitting several classes of traffic. Embodiments guarantee QoS, optimize transport cost, optimize switch-router port deployment, work on top of IETF standards, IEEE standards, and MEF standards.

One or more embodiments of the present invention have been described. Nevertheless, it will be understood that various modifications may be made without departing from the spirit and scope of the invention. Accordingly, other embodiments are within the scope of the following claims.

What is claimed is:

1. A Traffic Engineering (TE) method for a Long Term Evolution (LTE) multimedia IP network that obviates network over-provisioning by providing Quality of Service (QoS) to traffic classes comprising:
   acquiring Key Performance Indicators (KPI) and predefined Service Level Specifications (SLSs);
   partitioning S1/X2 interfaces into a plurality of Ethernet Virtual Connections (EVCs), with each EVC supporting one traffic class;
   dividing the total capacity of each S1/X2 interface among the classes it supports;
   constructing a per-class traffic table for each LTE switch-router interface;
   comparing each LTE switch-router traffic table with a short term traffic forecast table for that LTE switch-router;
   if the comparison is a good fit, acquiring network S1/X2 link current bandwidth profiles for each EVC and if not a good fit, using smoothing filters to remove transitory peaks in an LTE switch-router's per-class traffic table;
   for each S1/X2 link EVC, calculating a Committed Information Rate (CIR) bandwidth and a Peak Information Rate (PIR) bandwidth for each traffic class, class aggregate and link aggregate basis; and
   if the S1/X2 link EVC per class CIR and PIR bandwidths satisfy equipment capacity constrains, installing the S1/X2 link EVC per class CIR and PIR bandwidths in their respective LTE switch-routers via an Element Management System (EMS) as part of the network configuration.

2. The method according to claim 1 further comprising estimating each traffic class using a filter having an adjustable time window.

3. The method according to claim 1 further comprising partitioning S1/X2 links wherein the total capacity of each link is divided among the traffic classes it supports.

4. The method according to claim 3 further comprising partitioning the S1/X2 links differently.

5. The method according to claim 1 wherein each EVC has an elastic bandwidth.

6. The method according to claim 5 wherein each EVC may have the same or different SLS schemes and admission criteria.

7. The method according to claim 6 wherein a conversational service class may use an SLS scheme that ensures strict QoS.

8. The method according to claim 1 further comprising distinguishing real-time traffic in the network as Constant Bit Rate (CBR) sources and elastic (non-real-time) traffic as Variable Bit Rate (VBR) sources.

9. The method according to claim 8 wherein real-time traffic is comprised of streaming flows such as voice calls or MPEG-4 IP Multimedia Subsystem (IMS) videoconference (Video Share) calls.

10. The method according to claim 8 wherein elastic traffic is comprised of bursty flows such as MP3 downloads or file transfers.

11. The method according to claim 1 further comprising:
    acquiring traffic intensity and network state information from each LTE switch-router via a Network Management System (NMS);

maintaining a network topology using the network state information via the NMS; and computing the EVC CIR and PIR bandwidths from the network topology and the traffic intensity data.

12. The method according to claim 1 further comprising if the short term forecast is not available, generating the short term forecast.

13. A Traffic Engineering (TE) system that configures a Long Term Evolution (LTE) multimedia IP network's inventory of switch-routers with a bandwidth profile parameter for defined IP multimedia network traffic classes so that each traffic class receives an appropriate Quality of Service (QoS) comprising:

an LTE Connection Broker (LCB) configured for:
acquiring Key Performance Indicators (KPI) and predefined Service Level Specifications (SLSs);
partitioning S1/X2 interfaces into a plurality of Ethernet Virtual Connections (EVCs), with each EVC supporting one traffic class;
dividing the total capacity of each S1/X2 interface among the classes it supports;
constructing a per-class traffic table for each LTE switch-router interface;
comparing each LTE switch-router traffic table with a short term traffic forecast table for that LTE switch-router;
if the comparison is a good fit, acquiring network S1/X2 link current bandwidth profiles for each EVC and if not a good fit, using smoothing filters to remove transitory peaks in an LTE switch-router's per-class traffic table;
for each S1/X2 link EVC, calculating a Committed Information Rate (CIR) bandwidth and a Peak Information Rate (PIR) bandwidth for each traffic class, class aggregate and link aggregate basis; and
if the S1/X2 link EVC per class CIR and PIR bandwidths satisfy equipment capacity constraints, exporting a network configuration for the LTE network from the LCB; and an Element Management System (EMS) configured to receive the exported network configuration and install the S1/X2 link EVC per class CIR and PIR bandwidths in their respective LTE switch-routers as part of the network configuration.

14. The system according to claim 13 wherein the LCB is further configured for estimating each traffic class using a filter having an adjustable time window.

15. The system according to claim 13 wherein the LCB is further configured for partitioning S1/X2 links wherein the total capacity of each link is divided among the traffic classes it supports.

16. The system according to claim 15 wherein the LCB is further configured for partitioning the S1/X2 links differently.

17. The system according to claim 13 wherein each EVC has an elastic bandwidth.

18. The system according to claim 17 wherein each EVC may have the same or different SLS schemes and admission criteria.

19. The system according to claim 18 wherein a conversational service class may use an SLS scheme that ensures strict QoS.

20. The system according to claim 13 wherein the LCB is further configured for distinguishing real-time traffic in the network as Constant Bit Rate (CBR) sources and elastic (non-real-time) traffic as Variable Bit Rate (VBR) sources.

21. The system according to claim 20 wherein real-time traffic is comprised of streaming flows such as voice calls or MPEG-4 IP Multimedia Subsystem (IMS) videoconference (Video Share) calls.

22. The system according to claim 20 wherein elastic traffic is comprised of bursty flows such as MP3 downloads or file transfers.

23. The system according to claim 13 wherein the LCB is further configured for:
acquiring traffic intensity and network state information from each LTE switch-router via a Network Management System (NMS);
maintaining a network topology using the network state information via the NMS; and
computing the EVC CIR and PIR bandwidths from the network topology and the traffic intensity data.

24. The system according to claim 13 wherein the LCB is further configured for if the short term forecast is not available, generating the short term forecast.

25. A Traffic Engineering (TE) method for a Long Term Evolution (LTE) multimedia IP network that calculates a bandwidth profile parameter for defined IP multimedia network traffic classes comprising:
defining a set of Ethernet Virtual Connections (EVCs) for the network having elastic bandwidths;
receiving network traffic measurements and network state information such as per class call blocking;
for each network LTE switch-router:
acquiring network Service Level Specifications (SLSs);
acquiring a switch-router bandwidth profile;
setting EVC bandwidths for each traffic class;
reading defined network traffic class A and class B traffic;
calculating a class A and a class B bandwidth;
if the class A and class B calculated bandwidths comply with the SLS, setting Committed Information Rates (CIRs) and Peak Information Rates (PIRs) for the class A and B traffic, and if the class A and class B bandwidths do not comply with the SLS, recalculating the class A and B bandwidths;
reading defined network traffic class C and class D traffic;
calculating a class C and a class D bandwidth; and
if the class C and class D bandwidths comply with the switching router SLS, setting Committed Information Rates (CIRs) and Peak Information Rates (PIRs) for the class C and D traffic, and if the class C and class D bandwidths do not comply with the switching router SLS, recalculating the class C and D bandwidths.

26. The method according to claim 25 wherein the CIR and PIR EVC bandwidth profile parameters for class A, B, C and D traffic are for aggregate conversational, Internet Protocol Multimedia Services (IMS), streaming and interactive traffic classes.

27. The method according to claim 25 wherein the network carries a plurality of predefined traffic classes with each traffic class having a distinct SLS requirement defined by a network operator.

28. The method according to claim 25 wherein class A (conversational) and class B IMS traffic are aggregated into a real-time link partition.

29. The method according to claim 28 wherein class C (streaming) and class D (interactive) traffic are aggregated into an elastic link partition wherein elastic traffic may access any unused bandwidth on the real-time link partition.

30. The method according to claim 29 wherein the real-time and elastic link partitions are aggregated to create a link total aggregate.

31. The method according to claim 28 wherein a Kaufman-Roberts recursion is used to calculate the bandwidth allocated to aggregated conversational class A plus IMS class B ($BW_{A+B}$).

32. The method according to claim 25 wherein an M/G/1 Generalized Processor Sharing (M/G/1 GPS) is used to calculate the Committed Information Rate (CIR) for the interactive traffic class C bandwidth ($BW_C$).

33. The method according to claim 25 wherein an additive increase/multiplicative decrease model is used to calculate the Committed Information Rate (CIR), expected throughput, for the interactive traffic class D bandwidth ($BW_D$).

34. A Traffic Engineering (TE) system that configures a Long Term Evolution (LTE) multimedia IP network's inventory of switch-routers with a bandwidth profile parameter for defined IP multimedia network traffic classes so that each traffic class receives an appropriate Quality of Service (QoS) comprising:
  an LTE Connection Broker (LCB) configured for:
    defining a set of Ethernet Virtual Connections (EVCs) for the network having elastic bandwidths;
    receiving network traffic measurements and network state information such as per class call blocking;
    for each network LTE switch-router:
      acquiring network Service Level Specifications (SLSs);
      acquiring a switch-router bandwidth profile;
      setting EVC bandwidths for each traffic class;
      reading defined network traffic class A and class B traffic;
      calculating a class A and a class B bandwidth;
        if the class A and class B calculated bandwidths comply with the SLS, setting Committed Information Rates (CIRs) and Peak Information Rates (PIRs) for the class A and B traffic, and if the class A and class B bandwidths do not comply with the SLS, recalculating the class A and B bandwidths;
      reading defined network traffic class C and class D traffic;
      calculating a class C and a class D bandwidth;
        if the class C and class D bandwidths comply with the switching router SLS, setting Committed Information Rates (CIRs) and Peak Information Rates (PIRs) for the class C and D traffic, and if the class C and class D bandwidths do not comply with the switching router SLS, recalculating the class C and D bandwidths; and
    exporting a network configuration for the LTE network from the LCB; and
  an Element Management System (EMS) configured to receive the exported LTE network configuration and install the CIR and PIR EVC bandwidth profile parameters for class A, B, C and D traffic in their respective LTE switch-routers as part of the network configuration.

35. The system according to claim 34 wherein the CIR and PIR EVC bandwidth profile parameters for class A, B, C and D traffic are for aggregate conversational, Internet Protocol Multimedia Services (IMS), streaming and interactive traffic classes.

36. The system according to claim 34 wherein the network carries a plurality of predefined traffic classes with each traffic class having a distinct SLS requirement defined by a network operator.

37. The system according to claim 34 wherein class A (conversational) and class B IMS traffic are aggregated into a real-time link partition.

38. The system according to claim 37 wherein class C (streaming) and class D (interactive) traffic are aggregated into an elastic link partition wherein elastic traffic may access any unused bandwidth on the real-time link partition.

39. The system according to claim 38 wherein the real-time and elastic link partitions are aggregated to create a link total aggregate.

40. The system according to claim 37 wherein a Kaufman-Roberts recursion is used to calculate the bandwidth allocated to aggregated conversational class A plus IMS class B ($BW_{A+B}$).

41. The system according to claim 34 wherein an M/G/1 Generalized Processor Sharing (M/G/1 GPS) is used to calculate the Committed Information Rate (CIR) for the interactive traffic class C bandwidth ($BW_C$).

42. The system according to claim 34 wherein an additive increase/multiplicative decrease model is used to calculate the Committed Information Rate (CIR), expected throughput, for the interactive traffic class D bandwidth ($BW_D$).

* * * * *

UNITED STATES PATENT AND TRADEMARK OFFICE
CERTIFICATE OF CORRECTION

| | | |
|---|---|---|
| PATENT NO. | : 7,796,514 B2 | |
| APPLICATION NO. | : 12/316351 | |
| DATED | : September 14, 2010 | |
| INVENTOR(S) | : Dimas Noriega | |

It is certified that error appears in the above-identified patent and that said Letters Patent is hereby corrected as shown below:

In column 16, line 31, claim 1, please delete "equipment capacity constrains" and insert --equipment capacity constraints--

Signed and Sealed this
Second Day of October, 2012

David J. Kappos
*Director of the United States Patent and Trademark Office*